June 6, 1967 E. A. BROWN 3,323,793

APPARATUS FOR GENERATING TIMING SIGNALS FROM A RANDOM STARTING TIME

Filed Dec. 30, 1964 2 Sheets-Sheet 1

INVENTOR.
EDGAR ALAN BROWN

BY Otto Schmid, Jr.

ATTORNEY

United States Patent Office 3,323,793
Patented June 6, 1967

3,323,793

APPARATUS FOR GENERATING TIMING SIGNALS FROM A RANDOM STARTING TIME

Edgar Alan Brown, Saratoga, Calif., assignor to International Business Machines Corporation, Armonk, N.Y., a corporation of New York Filed Dec. 30, 1964, Ser. No. 422,302
13 Claims. (Cl. 271—51)

This invention relates to apparatus for generating signals and, more particularly, to apparatus for generating timing signals from a random starting time.

Although the invention is not so limited, the apparatus is especially adapted for generating timing signals for random record card feeding applications. In record card processing machines operated on line with a data processing system, a signal is sent from the processor to the record card machine to initiate the reading of a record card. Timing signals are generated in synchronism with the columns or rows of data read from the record card, and the timing signals are sent, along with the data signals, back to the processor to gate the data into the processor. Prior art systems for generating the timing pulses comprise electromechanical devices, but as the speed of the record card machines has increased, the problem of maintaining proper synchronization by electromechanical means has become more difficult. Another prior art system utilizes an electronic circuit comprising a counter which generates a plurality of vernier pulses for each data position and then locks on a particular one of the plurality of pulses, utilizing this pulse in each of the sequences for the timing pulse.

It is therefore a primary object of the invention to produce a magnetic timing device which has both the simplicity of electromechanical devices and the speed of the electronic systems for generating timing signals.

It is another object of the present invention to provide a magnetic device which generates timing signals of sufficient amplitude to be used directly with logic circuits.

It is another object of this invention to provide a magnetic device for generating a plurality of equally time-spaced pulses from a random starting time.

It is an additional object of this invention to provide a magnetic device for generating a plurality of pulses, each representing a predetermined displacement of an object.

It is a further object of this invention to provide a timing device for use in a random record card processing operation.

It is a still further object of this invention to provide a magnetic device for generating a plurality of pulses, each representing an equal arc or segment of a cycle rotation.

Briefly, according to the invention, there is provided a device for generating an electrical signal indicative of displacement comprising two magnetic members mounted so that a surface of one magnetic member is adjacent to extended portions of the other magnetic member to form a plurality of low reluctance regions, a magnetic transducing coil, means for energizing the transducer coil to record a magnetic signal on the first magnetic member opposite each of the low reluctance regions of the second magnetic member and sensing the magnetic signal by the magnetic transducing coil as the magnetic members are moved relatively to generate a series of timing pulses, one for each time the recorded signals pass the low reluctance regions.

The foregoing and other objects, features and advantages of the invention will be apparent from the following more particular description of a preferred embodiment of the invention, as illustrated in the accompanying drawings.

In the drawings, FIG. 1 is an end view of a rotary magnetic timing device embodying the invention.

Figure 1:
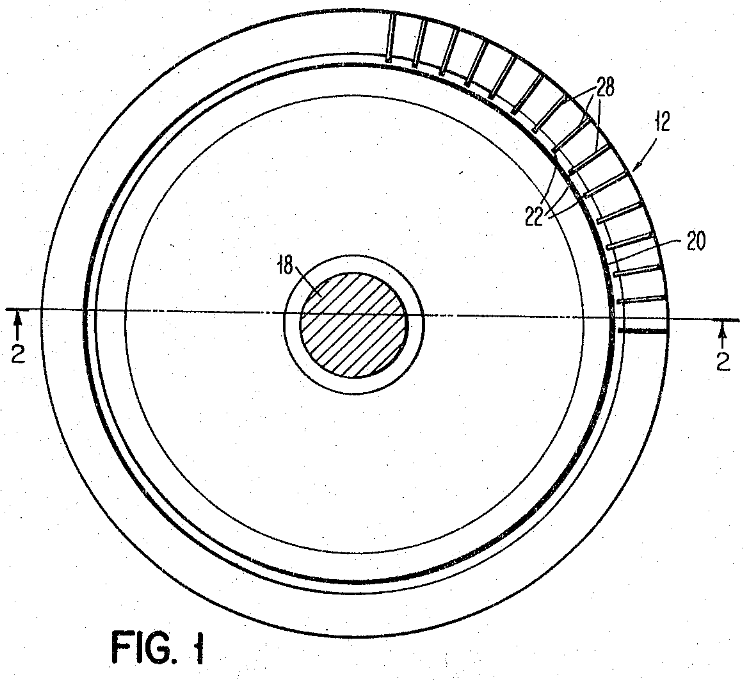

The magnetic timing device 8 illustrated in the drawings comprises, generally, a first magnetic member 10 having a plurality of low reluctance regions, a second magnetic member 12 mounted so that a surface thereof is adjacent the low reluctance regions of the first magnetic member, and a magnetic transducing coil 14 which is energizable to record magnetic signals on the surface of the first magnetic member opposite the low reluctance regions of the first magnetic member, and also being responsive to the recorded signals passing the low reluctance region to produce an electric signal as relative motion is imparted to the two magnetic members.

Figure 2:
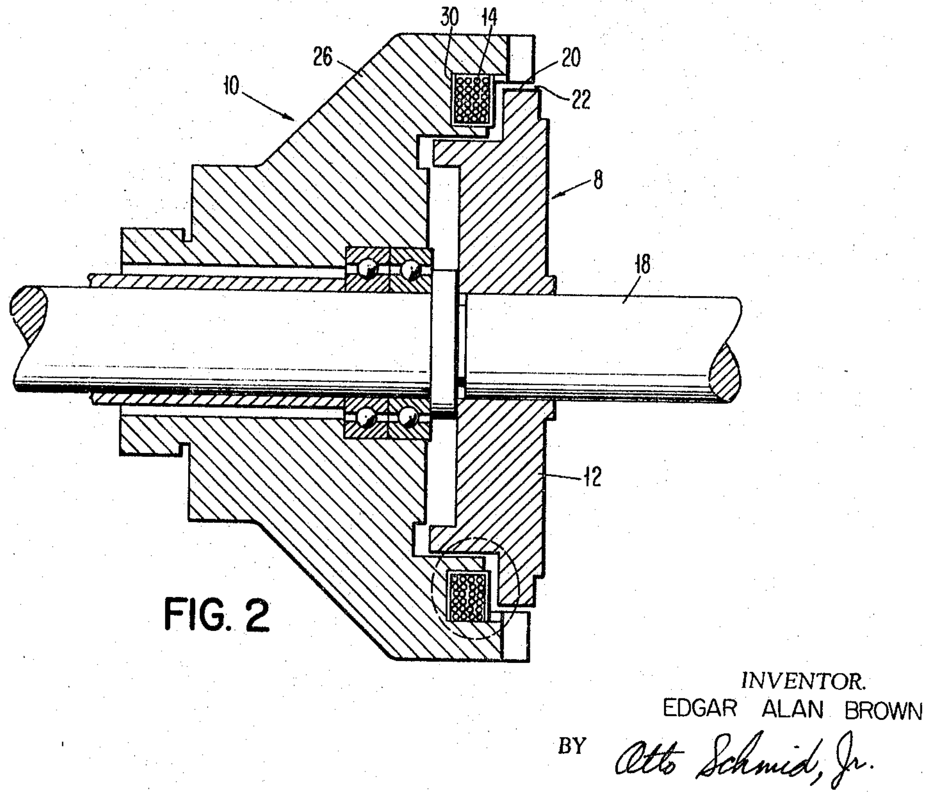
FIG. 2 is a section view taken along line 22 of FIG. 1.
Figure 5:
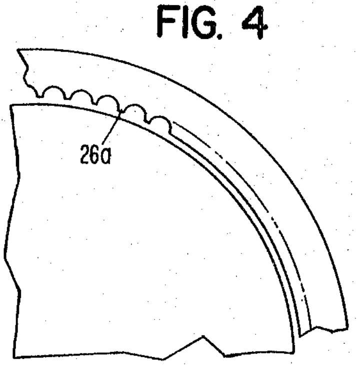
FIG. 5 shows an end view, partially cut away, showing an alternate way of obtaining the low reluctance regions of the device shown in FIG. 1.

A rotary form is employed in the embodiment of the invention illustrated in FIGS. 1 and 2 since this form of the invention is readily adaptable for generating timing signals for a record card feeding operation. The second magnetic member 12 comprises a disk mounted on a shaft 18. Shaft 18 preferably also drives the feed roll 16 for driving the record card through a reading station so that there is no problem of synchronization due to variable mechanical connections between the card feed mechanism and the timing device. A hard magnetic surface 20 is provided on the peripheral edge of the disk. A workable hard magnetic surface can be obtained by cold working the peripheral surface of the disk. However, a much better signal-to-noise ratio is obtained by a harder magnetic coating on the peripheral surface of the disk. The preferable hard magnetic surface is obtained by an electroplated cobalt coating which is preferably stressed in plating by varying the normal concentration of certain ions and/or the current density of the plating solution. One suitable method is disclosed in copending application Ser. No. 235,131, filed Nov. 2, 1962, entitled, "Method for Producing Magnetic Films," by Ignatius Tsu. The first magnetic member 10 comprises a hollow cylinder having a recess in one end so that the second magnetic member can be mounted with the hard magnetic surface closely adjacent to the inner surface of the recessed portion of the first magnetic member. A plurality of low reluctance regions 22 are provided between the surface 20 of disk 12 and the inner surface of member 26. The low reluctance regions 22 may be formed in any suitable manner. In the embodiment shown in FIGS. 1 and 2, the low reluctance regions are provided by cutting a plurality of equally spaced slots in the recessed portion of member 26 and fastening an insert of soft ferromagnetic material 28 in each of the slots so that they form a plurality of extended portions 24 with respect to the remainder of the inner surface of member 26. In one application it has been found that satisfactory operation is obtained if inserts 28 extend beyond the inner surface of member 26 by one thirty-second of an inch to within .002 of surface 20 when assembled. The inserts may be fastened in the slots by any suitable technique, such as by a press fit, for example. In the embodiment of the invention shown in FIG. 5, the low reluctance regions are formed by the provision of a plurality of integral extended portions 24*a* in the inner surface of member 26a adjacent to surface 20 of the disk. The extended portions of member 26a may be formed by any suitable technique, such as machining, by milling, casting or by an electrical erosion process, for example.

The magnetic transducing coil 14 comprises a continuous winding mounted in a recess 30 of the member 26. When current is passed through the coil, due to the relatively low reluctance paths, local magnetic signals are recorded on surface 20 opposite each of the extended regions 22. The path, as shown dotted in FIG. 2, comprises the body portion of member 26, through the insert 28, through the air gap between insert 28 and disk 12, through the hard magnetic material on the surface of the disk, through the body portion of the disk, through the air gap between the disk and the body portion of member 26, and thence back into the body of member 26.

Figure 3:
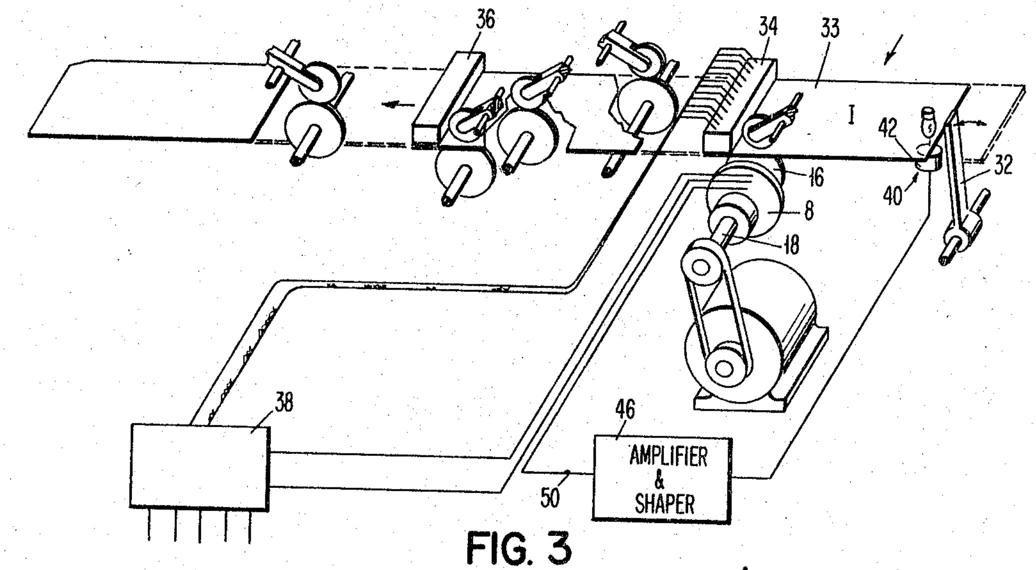
FIG. 3 shows a schematic, diagrammatic view of a card sensing system embodying the invention.
Figure 4:
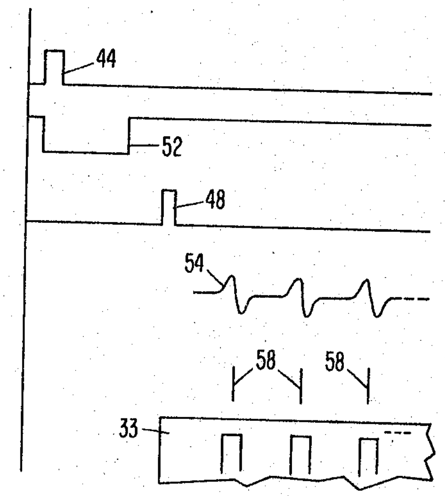
FIG. 4 shows a plot on a time base of the voltage waveforms associated with the card sensing system of FIG. 3.

Referring to FIG. 3, there is shown a record card sensing station. The station comprises constantly running feeding means 16 and a pusher member 32 selectively actuable (by means not shown) for moving a record card 33 into the feed means 16 so that the card will be driven past a sensing station 34, after which the card may be moved to another processing station 36 or to a stacker (not shown). The card sensing operation is under control of a processing unit 38 of a data processing system. When the card processing machine is being readied to start operation of the data processing system, a card is fed from a suitable feeding means to a preread station I where the card is aligned preparatory to being moved through the read station 34. When a command READ A CARD is given by the processing unit, the signal 44 is transmitted to the record card machine and control circuitry (not shown) is utilized to actuate read pusher 32 which functions to move the record card into the constantly running feed rolls. The signal READ A CARD is also used to activate circuits (not shown) to generate the ERASE signal 52. The ERASE signal is polarized to drive current through coil 14 in a predetermined direction. The duration of the ERASE signal is at least $1/n$ revolutions of the disk where $n$ is the number of low reluctance regions 22 between magnetic member 26 and surface 20. The ERASE operation may also be performed at any other suitable time in the system operation, such as after the eightieth column has been read, for example. When the record card 33 reaches a predetermined position relative to the read station, a sensing device 40 is actuated. The signal generated by sensing device 40 is utilized to energize coil 14 once for a time short with respect to $1/n$ to thereby write a plurality of magnetic signals equal to the number of low reluctance regions on the surface of disk 12 of the timing device. In the embodiment shown in the drawings, sensing device 40 comprises a light source and a solar cell 42. The predetermined position for mounting sensing device 40 relative to the reading station in the embodiment shown is the trailing edge of the card. This point is used since the column 80 end of the card is the registering end for IBM record card processing machines and the column 80 end is the trailing end in this application. However, another reference point on the record card may be used if desired. The lamp-solar cell assembly is placed a distance from the read station so that when the ideal location of a position on the card one column early with respect to the column one of the card is in read position, the trailing edge of the card uncovers solar cell 42. The signal generated thereby is coupled to amplifier and shaper 46 to produce the WRITE output signal 48 which is coupled over line 50 to energize coil 14 to record magnetized areas on the hard magnetic surface 20 of the disk in the direction opposite to that recorded by ERASE signal 52. As the disk is turned, a signal 54 is generated in coil 14 each time the recorded area on surface 20 of the disk and the ferromatic inserts 28 are aligned. Since the coil senses the output from a relatively large number of magnetic devices, a signal is generated at reasonable speeds in the order of a few volts which is of sufficient amplitude to drive logic circuits directly. The output voltage is essentially linear with speed over a wide range. In a particular system in which the disks are driven at 2000 r.p.m., output voltages from three to five volts have been obtained. However, it is usually desirable for timing applications to shape the pulses to produce sharper gating pulses which are synchronized with each of the columns of data. This can be accomplished by differentiating the wave and utilizing the portion of steep slope as the gating pulse. Also, circuitry may be used to sense the zero crossover of signal 54 to produce a timing signal 58 at the theoretical midpoint of each waveform, if desired. If desired, the position of sensing means 40 can be slightly adjusted so that timing signals 58 come at the theoretical midpoint of the record card data column when the peak of signal 54 is sensed.

Figure 6:
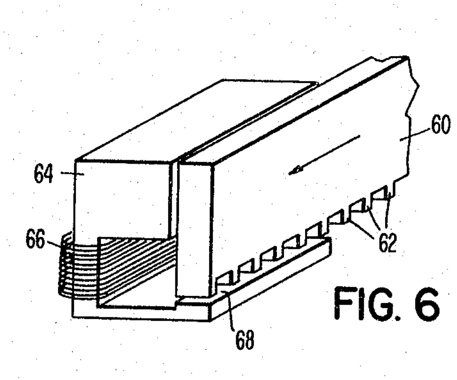
FIG. 6 is a diagrammatic, perspective view of apparatus embodying the invention for generating timing signals responsive to linear motion.

The invention can be embodied in many different forms. A linear embodiment is shown in FIG. 6. In this embodiment the first magnetic member comprises an elongated member 60 having a plurality of extended portions 62 on one side thereof. The second magnetic member comprises a second elongated member 64 having a substantially C-shaped cross section. A coil 66 is mounted to longitudinally encircle a portion of member 64. Member 60 is mounted (by means not shown) to enclose the opening of member 64 separated by a small air gap so that extended portions 62 of member 60 form a plurality of low reluctance regions. The surface 68 of member 64 is provided with a hard magnetic coating, such as plated cobalt, so that when an electrical current is passed through coil 66 a magnetic signal is recorded on surface 68 opposite each of the low reluctance areas. The apparatus comprising the embodiment provides a series of electrical signals generated in coil 66 due to movement of member 60 responsive to the alignment of the recorded signals on surface 68 and the low reluctance regions. In practice, member 64 is attached to a stationary part of the apparatus, such as a milling machine for example, and member 60 is attached to a movable part of the apparatus. After erasing any previous signals on surface 68, a signal is coupled to coil 66 to record a plurality of magnetic signals on surface 68. As member 60 is moved relative to the stationary member 64, coil 66 generates a plurality of electrical signals, each of which denotes a predetermined distance has been traversed by the moving portion of the apparatus.

In a particular rotary embodiment of the invention built for a record card feeding application, member 26 has sixty inserts 28 so that a record card is fed sixty columns for each revolution of the feed roll shaft 18. Due to the large number of magnetic devices present, the inoperability of a few of the devices due to inserts 28 being missing permits the device to continue to function with a comparatively small decrease in amplitude of the output signal.

Figure 7:
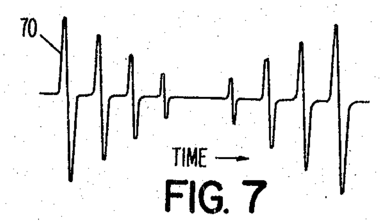
FIG. 7 is a plot of output voltage on a time base for an alternate embodiment of the invention.

This characteristic of the invention also makes it applicable to other problems by purposely providing a nonuniform pattern of inserts 28 in member 26. For example, if inserts 28b are provided uniformly spaced in only half of the member 26b, the output obtained is shown in FIG. 7. The WRITE signal causes magnetic signals to be recorded on only half of surface 20 so that the sensed output voltage 70 starts at a high amplitude due to all but one of the magnetic signals being aligned with inserts to produce a signal. Each succeeding signal results in a lower amplitude signal due to one less magnetic signal being in a position to generate an output voltage in coil 14. This decrease in amplitude continues until, at one-half cycle of rotation of member 10, no magnetic signals are aligned with inserts to produce an output voltage in coil 14, and the output then drops to zero. The output then builds up from zero to the high amplitude as the inserts are successively aligned with the recorded signals. The output voltage therefore varies linearly with shaft rotation between a maximum voltage V and zero. This device is thus useful in applications wherein it is desired to obtain an electrical signal output, the amplitude of which is directly related to the angular position of a shaft away from a random starting point.

Figure 8:
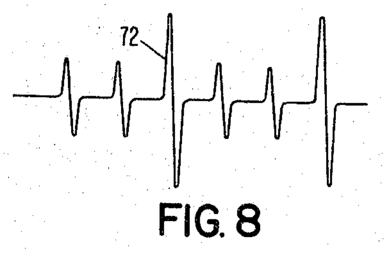
FIG. 8 is a plot of output voltage on a time base for another alternate embodiment of the invention.

The output voltage produced by another variation of the invention is shown in FIG. 8. In this embodiment, every third insert 28c is omitted from member 26c. Thus, when a magnetic signal is produced on surface 20 by a WRITE pulse, the output voltage 72 comprises an output wherein the first and the second output pulses are of a first amplitude and the third pulse is of a second higher amplitude essentially double the first amplitude. Thus it can be seen that many different arrangements are possible to generate a variety of output voltage patterns.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A device for generating electrical signals responsive to movement, comprising:
first and second magnetic members mounted for relative movement so that a surface of one of said magnetic members is adjacent to a plurality of extended portions of the other of said magnetic members to form a plurality of low reluctance regions therebetween;
a magnetic transducing coil;
means for energizing said transducer coil to record a magnetic signal on said surface opposite each of said low reluctance regions, each of said recorded magnetic signals having the same sense; and
means for moving said first member relative to said second member whereby said transducer coil is responsive to the recorded signals passing said low reluctance regions to produce an electric signal indicative of said movement.

2. A device for generating electrical signals responsive to movement, comprising:
a first magnetic member having a plurality of extended portions;
a second magnetic member, said first member and said second member being mounted so that a surface of said second member is adjacent to the extended portions of said first member so that a plurality of low reluctance regions is formed thereby;
a magnetic transducing coil;
means for energizing said transducer coil to record a magnetic signal on said surface opposite each of said low reluctance regions, each of said recorded magnetic signals having the same sense; and
means for moving said first member relative to said second member whereby said transducer coil is responsive to the recorded signals passing said low reluctance regions to produce an electric signal indicative of said movement.

3. A device for generating electrical signals responsive to movement, comprising:
a first magnetic member having a plurality of extended portions;
a second magnetic member having a hard magnetic coating on a surface thereof, said first member and said second member being mounted so that said surface of said second member is adjacent to the extended portions of said first member to form a plurality of low reluctance regions therebetween;
a magnetic transducing coil;
means for energizing said transducer coil to record a magnetic signal on said surface opposite each of said low reluctance regions, each of said recorded magnetic signals having the same sense; and
means for moving said first member relative to said second member whereby said transducer coil is responsive to the recorded signals passing said low reluctance regions to produce an electric signal indicative of said movement.

4. A device for generating electrical signals responsive to movement of an object, comprising:
a first magnetic member having a plurality of extended portions;
a second magnetic member, said first member and said second member being mounted so that a surface of said second member is adjacent to the extended portions of said first member to form a plurality of low reluctance regions;
a magnetic transducing coil;
means for sensing the position of said object;
means responsive to said position sensing means for energizing said transducer coil to record a magnetic signal on said surface opposite each of said low reluctance regions; and
means for moving said first member relative to said second member whereby said transducer coil is responsive to the recorded signals passing said low reluctance regions to produce an electric signal indicative of said movement.

5. A device for generating electrical signals responsive to movement, comprising:
a circular magnetic member having a plurality of extended portions;
a disk-shaped magnetic member, said magnetic members being coaxially mounted so that a surface of said disk member is adjacent to the extended portions of said circular member to form a plurality of low reluctance regions therebetween;
a magnetic transducing coil;
means for energizing said transducer coil to record a magnetic signal on said disk surface opposite each of said low reluctance regions, each of said recorded magnetic signals having the same sense; and
means for rotating said disk member relative to said circular member whereby said transducer coil is responsive to the recorded signals passing said low reluctance regions to produce an electric signal indicative of said movement.

6. A device for generating electrical signals responsive to movement, comprising:
a first magnetic member having a plurality of nonuniformly spaced extended portions;
a second magnetic member, said first member and said second member being mounted so that a surface of said second member is adjacent to the extended portions of said first member to form a plurality of low reluctance regions therebetween;
a magnetic transducing coil;
means for energizing said transducer coil to record a magnetic signal on said surface opposite each of said low reluctance regions, each of said recorded magnetic signals having the same sense; and
means for moving said first member relative to said second member whereby said transducer coil is responsive to the magnetic signals passing said low reluctance regions to produce an electric signal which is a summation of said electric signals from each said magnetic signal and said low reluctance regions then aligned.

7. A device for generating electrical signals responsive to movement, comprising:
a first elongated magnetic member having a plurality of extended portions;
a second elongated magnetic member, said first member and said second member being mounted so that a surface of said second member is adjacent to the extended portions of said first member to form a plurality of low reluctance regions therebetween;
a magnetic transducing coil enclosing said second magnetic member;
means for energizing said transducer coil to record a magnetic signal on said surface opposite each of said low reluctance regions; and means for moving said first member relative to said second member along a predetermined path whereby said transducer coil is responsive to the recorded signals passing said low reluctance regions to produce an electric signal indicative of said movement along said path.

8. A device for generating electrical signals responsive to movement, comprising:

a first elongated magnetic member having a plurality of extended portions;

a second elongated magnetic member comprising a C-shaped cross section having a hard magnetic coating on a surface thereof, said first member and said second member being mounted closely adjacent so that a substantially closed magnetic path is formed with said surface of said second member being adjacent to one or more of the extended portions of said first member to form one or more low reluctance regions therebetween;

a magnetic transducing coil enclosing a longitudinal portion of said second magnetic member;

means for energizing said transducer coil to record a magnetic signal on said surface opposite each of said low reluctance regions; and means for moving said first member relative to said second member along a linear path whereby said transducer coil is responsive to the recorded signals passing said low reluctance regions to produce an electric signal indicative of said movement along said path.

9. A device for generating electrical signals responsive to movement, comprising:

a circular magnetic member having a plurality of extended portions;

a disk-shaped magnetic member having a hard magnetic coating on the preipheral surface thereof, said magnetic members being coaxially mounted so that said surface of said disk member is adjacent to the extended portions of said circular member to form a plurality of low reluctance regions therebetween;

a magnetic transducing coil mounted within said circular magnetic member adjacent to said low reluctance regions;

means for energizing said transducer coil to record a magnetic signal on said disk surface opposite each of said low reluctance regions, each of said recorded magnetic signals having the same sense; and means for rotating said disk member relative to said circular member whereby said transducer coil is responsive to the recorded signals passing said low reluctance regions to produce an electric signal indicative of said movement.

10. A device for generating electrical signals responsive to movement of a record card through a processing station, comprising:

means for driving a record card through a processing station;

a first magnetic member having a plurality of extended portions;

a second magnetic member coupled for synchronous rotation which said record card driving means, said first member and said second member being coaxially mounted so that a surface of said second member is adjacent to the extended portions of said first member to form a plurality of low reluctance regions therebetween;

means for selectively moving a record card into said driving means;

means for sensing the position of said record card relative to said processing station;

a magnetic transducing coil;

means responsive to said position sensing means for energizing said transducer coil to record a magnetic signal on said surface opposite each of said low reluctance regions, said transducer coil being responsive to the recorded signals passing said low reluctance regions to produce a series of electric signals indicative of the movement of the record card through said processing station.

11. A device for generating electrical signals responsive to movement of a record card through a processing station, comprising:

means for driving a record card through a processing station;

a circular magnetic member having a plurality of extended portions;

a magnetic disk member mounted for synchronous rotation with said record card driving means, said disk member having a hard magnetic coating on the peripheral surface thereof, said magnetic members being coaxially mounted so that said surface of said disk member is adjacent to the extended portions of said circular member to form a plurality of low reluctance regions therebetween;

means for selectively moving a record card into said driving means;

means for sensing the position of said record card relative to said processing station;

a magnetic transducing coil mounted within said circular member adjacent to said low reluctance regions;

means responsive to said position sensing means for energizing said transducer coil to record a magnetic signal on said surface opposite each of said low reluctance regions, said transducer coil being responsive to the recorded magnetic signals passing said low reluctance regions to produce a series of electric signals indicative of the movement of the record card through said processing station.

12. A device for generating electrical signals responsive to movement, comprising:

a circular magnetic member having a plurality of extended portions;

a disk-shaped magnetic member, said magnetic members being coaxially mounted on an axis so that a surface of said disk member is adjacent to the extended portions of said circular member to form a plurality of low reluctance regions therebetween;

a magnetic transducing coil, said magnetic transducing coil being in a plane substantially normal to said axis;

means for energizing said transducer coil to record a magnetic signal on said disk surface opposite each of said low reluctance regions; and means for rotating said disk member relative to said circular member whereby said transducer coil is responsive to the recorded signals passing said low reluctance regions to produce an electric signal indicative of said movement.

13. A device for generating electrical signals responsive to movement, comprising:

a circular magnetic member having a plurality of extended portions;

a disk-shaped magnetic member having a hard magnetic coating on the peripheral surface thereof, said magnetic members being coaxially mounted on an axis so that said surface of said disk member is adjacent to the extended portions of said circular member to form a plurality of low reluctance regions therebetween;

a magnetic transducing coil mounted within said circular magnetic member substantially normal to said axis and adjacent to said low reluctance regions;

means for energizing said transducer coil to record a magnetic signal on said disk surface opposite each of said low reluctance regions; and means for rotating said disk member relative to said circular member whereby said transducer coil is responsive to the recorded signals passing said low reluctance regions to produce an electric signal indicative of said movement.

References Cited

UNITED STATES PATENTS

| | | | |
|---|---|---|---|
| 2,078,805 | 4/1937 | Merrill | 310—156 |
| 2,703,862 | 3/1955 | Gordon | 317—5 X |
| 2,767,368 | 10/1956 | Kober | 310—156 X |
| 2,786,978 | 3/1957 | Warner | 324—70 |
| 2,913,662 | 11/1959 | Hogan | 324—70 |
| 3,024,374 | 3/1962 | Stauder | 310—15 |

M. HENSON WOOD, Jr., *Primary Examiner.*

ALLEN N. KNOWLES, *Examiner.*